April 4, 1939.   F. STEINER   2,153,284

ENGINE VALVE

Original Filed July 3, 1935

Inventor
Frank Steiner

By Albert L. Ely
Attorney

Patented Apr. 4, 1939

2,153,284

UNITED STATES PATENT OFFICE 2,153,284

ENGINE VALVE

Frank Steiner, Hempstead, N. Y.

Refiled for abandoned application Serial No. 29,754, July 3, 1935. This application December 23, 1936, Serial No. 117,422

5 Claims. (Cl. 123—188)

Valves for internal combustion engines which respond to cam actuated tappets for developing their opening and closing movement are frequently subject to "sticking" or other defective operations. Generally the cause of this action is due to the accumulation of carbon and/or other extraneous matter which occurs in more or less built up quantities in proximity to the inner end of the guide sleeve for the valve stem as well as within the guide sleeve.

The primary object of the present invention is to overcome this fault as well as to generally improve the conditions under which the valves operate without materially adding to production costs or otherwise sacrificing the present recognized highly developed qualities existing in valves of this type. This application contains the same disclosure of my prior filed application Serial Number 29,754, filed July 3, 1935.

For the purpose of illustrating the application of the invention an illustrative embodiment of the same is shown in the accompanying drawing.

Figure 1:
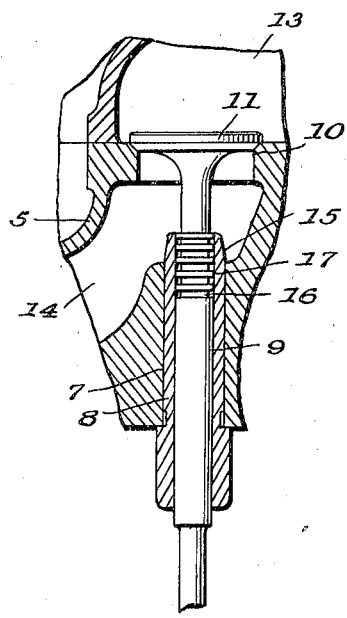
Fig. 1 is a view in section of a portion of an L-head engine block with a valve fashioned in accordance with the invention shown in closed position.
Figure 2:
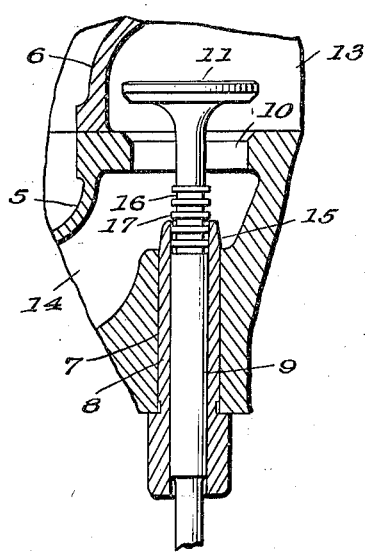
Fig. 2 is a similar view showing the valve open.

Referring now to the drawing in detail and with particular reference to Figs. 1 and 2, 5 represents the block of an L-head engine and 6 the head thereof. As is customary the block 5 is formed with a bore 7 to accommodate the guide sleeve 8 for the valve stem 9.

A seat 10 for the valve head 11 is provided as at 12 so that the valve can control the communicating opening between the combustion space 13 in the head 6 and the exhaust passage 14 in the side of the block 5.

It so happens that carbon and/or other extraneous deposits frequently accumulate in the proximity of the inner end 15 of the guide sleeve 8 as well as within the sleeve and as a result the proper operation of the valve is seriously affected. This defective operation is usually referred to as "sticking". It means in severe cases that the resistance offered by accumulated deposit is sufficient to entirely overcome the influence of the spring which seats the valve with a result that the valve becomes totally inoperative or in other instances where the deposit is not so severe the valve may still continue to seat, although improperly, but not with sufficient freedom of action to develop the desired closing action. These varying conditions are of course only a matter of degree in the defective operation of the valve and unless corrected entirely the performance of the engine must suffer the results.

The present invention is designed primarily to prevent the accumulation of the deposits which cause this defective operation and in its preferred form the result is accomplished by turning or otherwise forming a plurality of alternating circumferential grooves and flanges or elevations 16 and 17 respectively on the valve stem 9 in proximity to the inner end 15 of the guide sleeve 8. A plurality of these grooves and flanges as compared to a single groove and flange are employed for a decidedly definite purpose and this should be kept in mind in considering the invention.

The purpose of the plurality of grooves and flanges is to divert and break up the exhaust gases and thus prevent the burnt gas from following down the valve stem into the sleeve. The grooves and flanges set up an agitation or turbulence which literally blows the deposit away from the vicinity of the valve. When the valve is seated as shown in Fig. 1 all of the grooves and flanges are receded within the sleeve and when the valve is open as shown in Fig. 2 only a portion of the grooves and flanges project out of the sleeve. When the valve opens what little deposit that may be on the stem is scraped off as the stem goes down. As the stem raises the deposit thus scraped off is blown free of the stem by the next exhaust.

The circumference of the valve stem being interrupted or broken up by the grooves and flanges prevents the deposit from accumulating and what little deposit that may occur is so inconsequential that it will in no way effect the operation of the valve.

It should be pointed out that some guide sleeves are longer than others and when the invention is applied to stems working in short guides the grooves and flanges must be formed lower on the stem.

Figure 3:
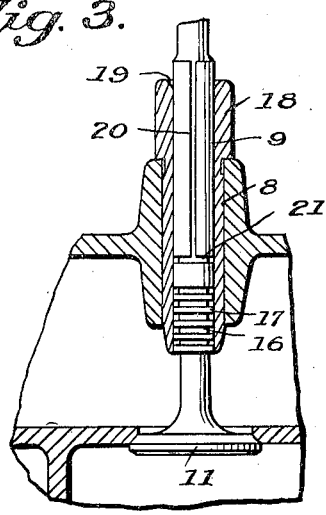
Fig. 3 is a view in section of a portion of an engine block of the overhead valve type with a valve fashioned in accordance with the invention shown in closed position.
Figure 4:
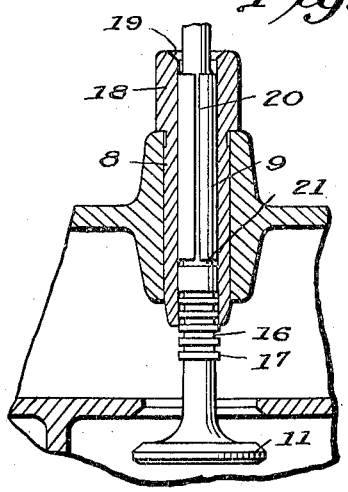
Fig. 4 is a view similar to Fig. 3 but showing the valve open.

In Figs. 3 and 4 the invention is shown applied to an overhead valve assembly where the same advantages may be realized. Some types of overhead engines however supply oil at the top of the engine and for this reason the butt end 18 of the guide sleeve 8 is cupped as at 19 to collect oil from where it may be directed into the longitudinal groove and to the continuous circumferential groove 21 for oiling the stem.

The width and depth of the groove 20 is such as to deliver only sufficient oil to the inside of the sleeve for lubricating purposes so that there will be no excess present to work down into the grooves 16.

Actual tests under abnormal working conditions such as, for example, idling an engine with a retarded spark or ignition point over long periods of time have shown that a valve of the type herein disclosed functions with maximum advantage and is substantially free from carbon deposits and does not stick in the guide. Under normal working conditions, the valve has not shown any tendency to stick or to accumulate carbon.

What I claim is:

1. In combination, a valve having a head and a stem, a seat for the head, a guide in which the stem is mounted for restricted sliding movement and a plurality of grooves and flanges formed on the valve stem adjacent said head and located thereon in position to be covered by the guide when the valve is seated and a predetermined number only exposed when the valve is opened.

2. In a valve assembly, a valve having a head and a stem, a seat for the head, a guide in which the stem is mounted for restricted sliding movement and a plurality of grooves and flanges located on the valve stem adjacent said head in position to co-operate with the inner end of the guide and to be exposed to the exhaust gases when said valve is open.

3. In a valve assembly, a valve having a head and a stem, a seat for the head, a guide in which the stem is mounted for restricted sliding movement and a plurality of grooves and flanges located on the valve stem adjacent said head in position; whereby a predetermined number only will be advanced beyond the inner end of the guide when the valve is opened.

4. In an internal combustion engine, the combination of valve having a head and stem, a guide for the stem entering the exhaust passage of the engine, a seat for the valve head and a plurality of grooves and flanges located on the valve stem adjacent said head in position to co-operate with the inner end of the guide to exclude the exhaust from the inside of the guide and to be exposed to the exhaust when said valve is open.

5. In a valve assembly a valve having a head and stem, a seat for the head, a guide sleeve in which the stem is slidably mounted, said stem having an annular groove and a longitudinal communicating groove for introducing a lubricant into the guide sleeve and a plurality of annular grooves and flanges on the stem adjacent said head between said lubricant introducing grooves and the valve head, and located on the stem in position to co-operate with the inner end of the guide sleeve substantially as and for the purpose described.

FRANK STEINER.